UNITED STATES PATENT OFFICE.

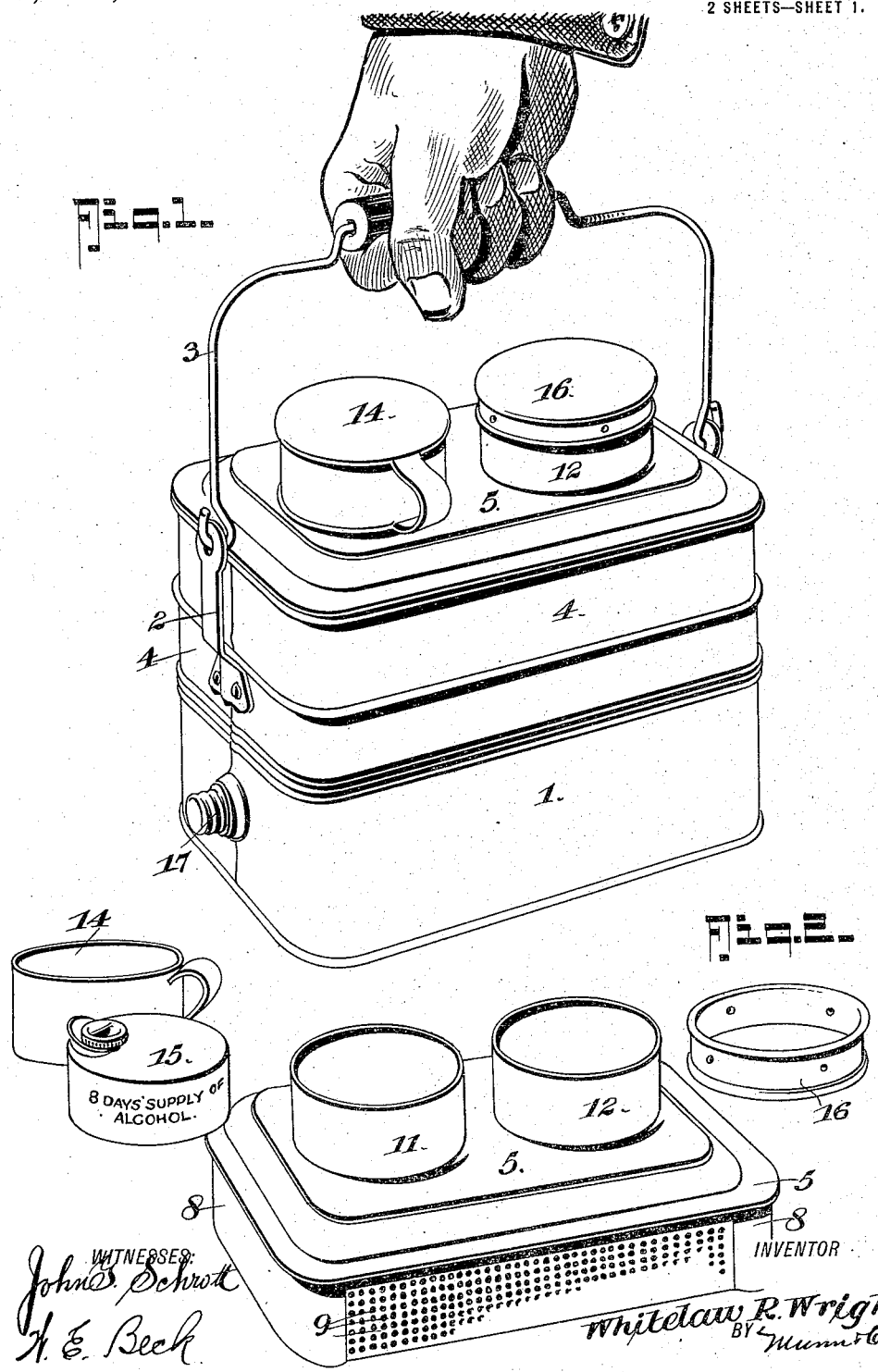

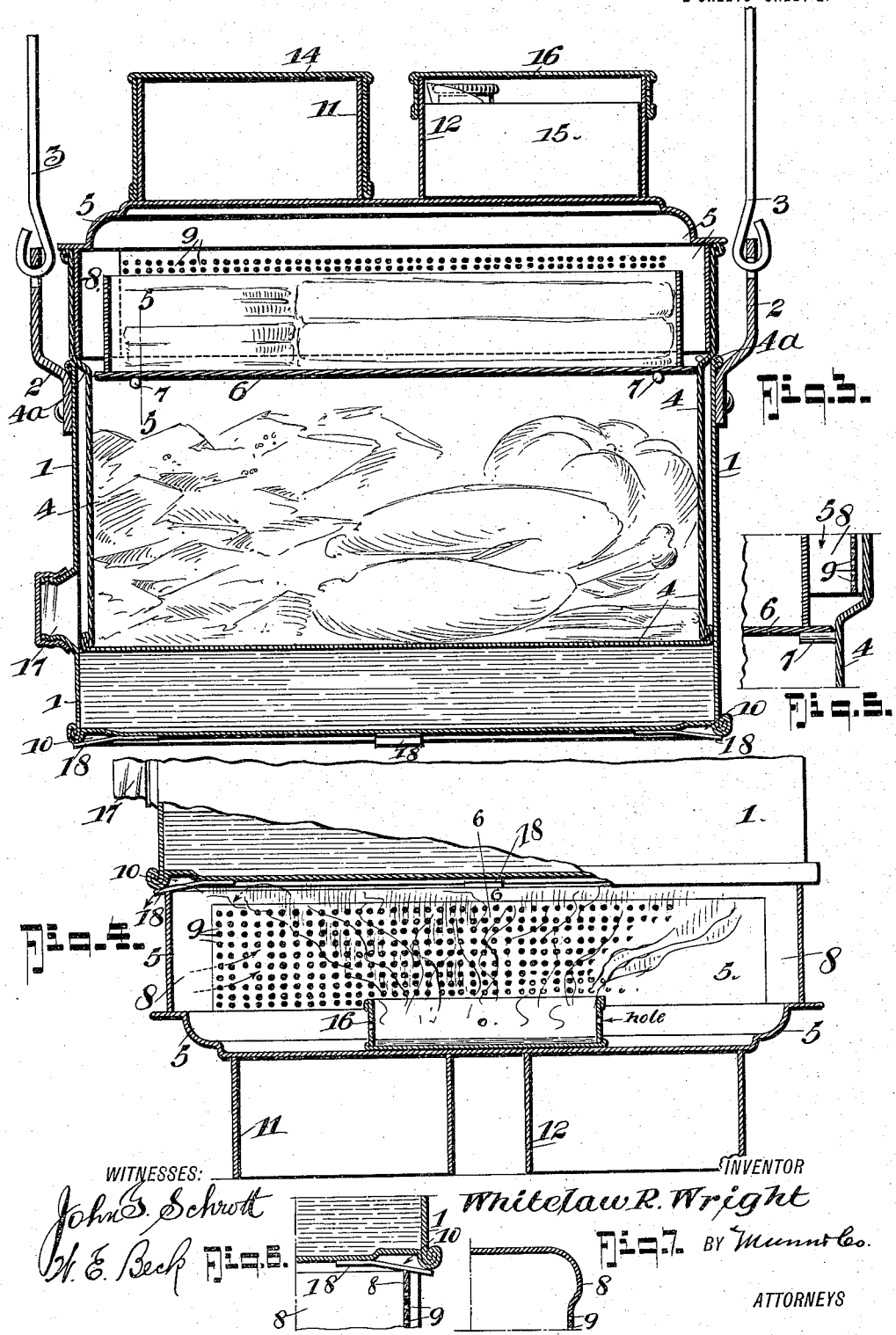

WHITELAW R. WRIGHT, OF MARION, INDIANA.

DINNER-PAIL.

1,167,142. Specification of Letters Patent. Patented Jan. 4, 1916.

Application filed October 12, 1915. Serial No. 55,510.

*To all whom it may concern:*

Be it known that I, WHITELAW R. WRIGHT, a citizen of the United States, and a resident of Marion, in the county of Grant and State of Indiana, have made certain new and useful Improvements in Dinner-Pails, of which the following is a specification.

This invention is an improvement in dinner-pails or lunch-heaters, and is embodied in certain novel features of construction, combination, and arrangement of parts, as hereinafter described and claimed.

Among the objects of my invention is to provide a dinner-pail that shall, within the usual compass, not only provide suitable containers for both solid and liquid food, but also within that compass provide means for heating said food.

Other objects of my invention will appear in the detailed description thereof.

In the drawings which constitute part of this application and in which the same reference characters refer to the same parts throughout.

Figure 1 is a perspective view of my improved dinner-pail. Fig. 2 is a perspective view of the detachable cover of the pail and certain attachments thereof disassociated. Fig. 3 is a central longitudinal vertical section of my pail. Fig. 4 is a central longitudinal section of the cover of the pail showing it inverted to serve as a support and heater for the outer shell or body of the pail. Fig. 5 is a sectional view on line 5—5 of Fig. 3 showing the manner of supporting the detachable food-tray in the upper portion of the pail. Fig. 6 is a detailed section on the line 6—6 of Fig. 4. Fig. 7 is a vertical transverse section of one side of the pail cover.

I provide a shell or body portion 1, having the usual ears 2 and bail 3. Within such body portion is held the main food receptacle 4, to which the cover 5 is applied. A food-tray 6 is also inserted in the latter and rests on supports provided by means of laterally projecting pins 7, which are soldered to the side walls of the food receptacle, as shown in Fig. 5. The food receptacle 4 is practically a deep dish having its upper portion provided with shoulders 4ª—see Fig. 3—which abuts and rests upon the upper edge of the body or shell 1. Thus the bottom of the food-receptacle 4 is held normally supported above the bottom of the body or shell 1 sufficiently far to allow space for a quart of coffee.

The cover 5 is provided with a pendent flange 8 which fits snugly within the upper portion of receptacle 4. Said flange is provided with a plurality of holes 9, on each of its longitudinal sides for admission of air to support combustion. On the upper surface of said cover, and equally spaced from either end thereof, are soldered two rings 11 and 12, one (11) serving as a holder for a drinking-cup 14 and the other (12) serving as a container for a receptacle for denatured alcohol.

Coffee or other liquid is carried in the lower portion of the shell or body 1, as indicated at $x$ in Figs. 3, 4, and this may be quickly heated in the following manner: First, the cover 5 is removed from the main food-receptacle 4, and inverted as shown in Fig. 4, which constitute supports for it. Then the caps 16 of the ring 12 is detached and inverted within the cover 5, as shown in Fig. 4, and a tablespoon full of denatured alcohol is poured into said cap and ignited. The shell or body 1 containing the coffee being then placed on the inverted cover 5, as shown in Fig. 4, the coffee becomes quickly heated.

The perforations 9 in the vertical flange 8 of the cover 5 permits ready passage of air to support combustion of the alcohol, and the fumes or unconsumed gaseous products arising from combustion find convenient escape through the passage or space provided between the coffee container 1 and the flange 8 of the cover 5, as indicated in Figs. 3, 4, and 6, wherein it will be noted that the bottom of the coffee receptacle has a groove 10 adjacent to its edge, which groove is bridged by small transverse plates 18.

It will be further seen that the perforated sides of the cover 5 are bent inward to provide increased air space—see Figs. 6 and 7.

A discharge nozzle 17, having a screw cap, is applied to one end of the shell or coffee receptacle, its location being just above the usual height of the coffee in the receptacle so that none will escape save when the pail is tilted to a certain degree.

I claim:—

1. A dinner-pail comprising an outer shell or body portion, a food-receptacle supported in said body portion, a food-tray supported in said receptacle, a cover on the receptacle having on its upper surface two cylindrical projections, one adapted to contain a fuel can and both serving as supports for the cover when inverted, said cover having a plurality of holes in its sides, for passage of air, as described.

2. A dinner pail comprising an invertible cover having its sides provided with air passages, and a body serving as a coffee receptacle and adapted to be placed and supported on said cover when the latter is inverted, the body having its bottom provided with devices which extend across the edge of the cover flange to provide a space for circulation of gases, as described.

WHITELAW R. WRIGHT.

Witnesses:
SARAH P. WRIGHT,
NELLIE WRIGHT.

Copies of this patent may be obtained for five cents each, by addressing the "Commissioner of Patents, Washington, D. C."